United States Patent [19]

Kasuya

[11] 4,157,881
[45] Jun. 12, 1979

[54] TURBOSUPERCHARGER

[75] Inventor: Tamotsu Kasuya, Oyama, Japan

[73] Assignee: Kabushiki Kaisha Komatsu Seisakusho, Tokyo, Japan

[21] Appl. No.: 826,253

[22] Filed: Aug. 19, 1977

[30] Foreign Application Priority Data

Aug. 19, 1976 [JP] Japan .......................... 51-110246[U]
Aug. 19, 1976 [JP] Japan .......................... 51-110247[U]

[51] Int. Cl.² .............................................. F01D 25/18
[52] U.S. Cl. .................................. 417/407; 184/6.11; 415/175
[58] Field of Search ................. 60/39.08; 415/175; 417/407, 408, 409, 405, 406; 184/6.11

[56] References Cited

U.S. PATENT DOCUMENTS 3,740,170  6/1973  Miller ................................. 417/407
3,890,780  6/1975  Hagemeister et al. .............. 60/39.08

FOREIGN PATENT DOCUMENTS 1195550  6/1965  Fed. Rep. of Germany .......... 417/407

Primary Examiner—Carlton R. Croyle
Assistant Examiner—Michael Koczo, Jr.
Attorney, Agent, or Firm—Armstrong, Nikaido, Marmelstein & Kubovcik

[57] ABSTRACT

A turbosupercharger provided with means for preventing lubricant fatigue comprising a center housing having an inlet and an outlet for lubricant, a turbine casing mounted on said center housing at one end thereof, a compressor casing fixedly secured to said center housing at the other end thereof, and a turbine shaft rotatably mounted within said center housing, said turbine shaft having a turbine rotor at one end thereof within said turbine casing and a compressor rotor at the other end thereof within said compressor casing. The center housing has a chamber formed therein so as to receive lubricant slung out of the periphery of said turbine shaft and a communication hole formed therein to connect the inlet for lubricant with said chamber thereby injecting pressurized lubricant into said chamber through said communication hole.

1 Claim, 3 Drawing Figures

TURBOSUPERCHARGER

BACKGROUND OF THE INVENTION

This invention relates to a turbosupercharger and more particularly to a turbosupercharger with means for preventing lubricant fatique to be used therewith.

The turbosupercharger which has heretofore been generally used comprises a center housing, a turbine casing and a compressor casing, and a turbine shaft is rotatably supported within the center housing, said turbine shaft having at one end thereof a turbine rotor located within the turbine casing and also having at the other end thereof a compressor rotor located within the compressor casing. The center housing has a lubricant supply hole formed therein, and the lubricating oil injected through the hole is supplied to journal bearings which support the turbine shaft rotatably. The lubricating oil thus supplied is radially splashed by the rotation of the turbine shaft so that the upwardly splashed lubricant passes through the inner wall of the center housing and is drained through a lower drain hole, and the lubricant is injected again through the lubricant supply hole for reuse.

Since the wall of the center housing defined on the side of the turbine rotor is exposed to a comparatively high temperature, the lubricant brought into contact with the wall is liable to be carbonized and deteriorated for a short time.

SUMMARY OF THE INVENTION

It is an object of the present invention to provide a turbosupercharger wherein the service life of lubricant to be used therewith can be considerably prolonged.

According to one aspect of the present invention, there is provided a turbosupercharger provided with means for preventing lubricant fatique comprising a center housing having an inlet and an outlet for lubricant, a turbine casing mounted on said center housing at one end thereof, a compressor casing fixedly secured to said center housing at the other end thereof, and a turbine shaft rotatably mounted within said center housing, said turbine shaft having a turbine rotor at one end thereof within said turbine casing and a compressor rotor at the other end thereof within said compressor casing.

The center housing has a chamber formed therein so as to receive lubricant slung out of the periphery of said turbine shaft and means formed therein for communicating the inlet for lubricant with said chamber thereby injecting pressurized lubricant into said chamber through said means.

The wall of said center housing facing the turbine rotor may be cooled down by the injection of the pressurized lubricant into said chamber.

According to another aspect of the present invention, in addition to providing means for communicating the inlet for lubricant with said chamber; a baffle plate is arranged between said chamber and the shaft seal portion of said turbine shaft so as to prevent the lubricant slung out of the periphery of the shaft seal portion from striking the oil jet of newly introduced lubricant from the inlet.

Other objects, features and advantages of the present invention will be readily apparent from the following description taken in conjunction with the following drawings.

DETAILED DESCRIPTION OF THE INVENTION

Figure 1:
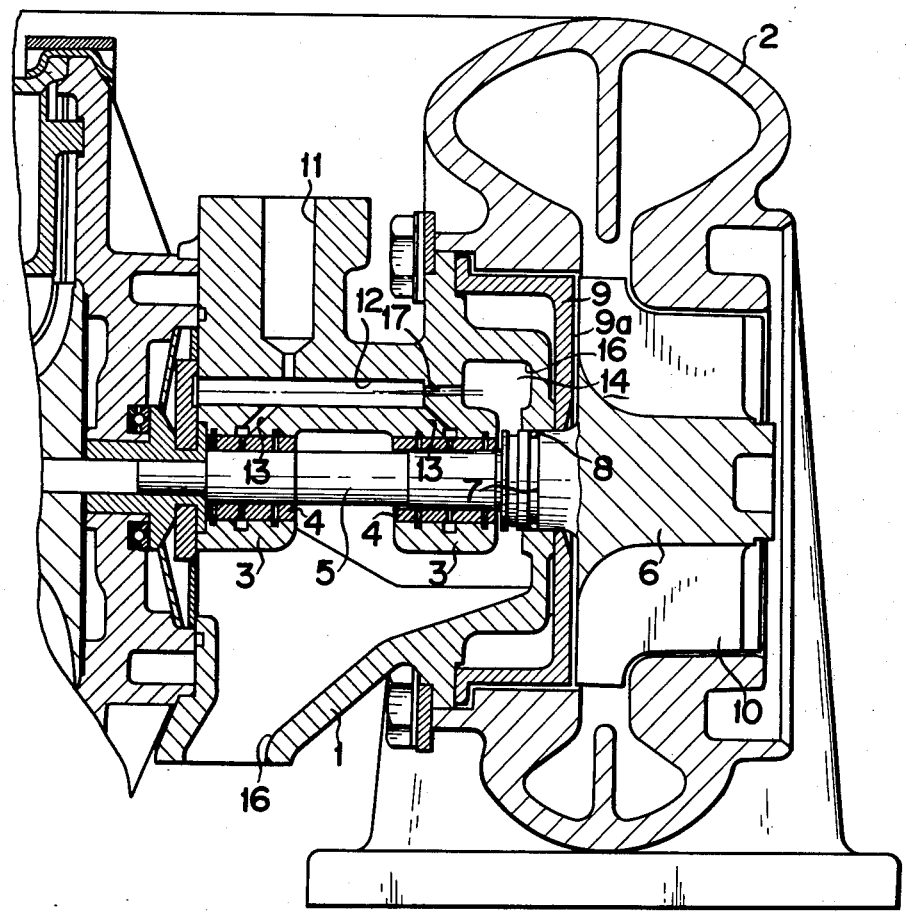
FIG. 1 is a longitudinal cross-sectional view of a turbosupercharger according to the present invention.

In general, the conventional turbosupercharger comprises, as shown in FIG. 1, a center housing 1 and a turbine casing 2, and a turbine shaft 5 is rotatably carried by journal bearings 4, 4 secured in shaft bearing portions 3, 3 of the center housing 1. The turbine shaft 5 has a turbine rotor 6 formed at one end thereof. The turbine shaft 5 has a shaft seal portion 7 formed thereon having a seal ring 8. Mounted on the center housing on the side of the turbine rotor is a heat shroud 9 which has an end face 9a located against the turbine rotor 6.

The center housing 1 has a lubricant supply hole 11 drilled therein which communicates through lubricant holes 12 and 13 with journal bearings 4 and 4.

The lubricant supplied through the lubricant supply hole 11 is fed through the lubricant feeding holes 12 and 13 into the journal bearings 4 and 4 so that it may be splashed radially by the rotation of the turbine rotor and sent into a lubricant relief chamber 14 formed on the upper part of the shaft seal portion 7. The lubricant introduced into the lubricant relief chamber 14 passes along the inner wall of the center housing 1 and is discharged out so that it can be reused by injecting it again through the lubricant supply hole 11.

However, since the turbine rotor 6 is exposed to high temperatures of 600° C. to 700° C., wall 16 of the oil relief chamber 14 on the side of the turbine rotor will be heated to a comparatively high temperature so that the lubricant passing along the wall 16 on the side of turbine is exposed to a high temperature and deteriorated (mainly carbonized) for a short period of use.

For example, after the lapse of 200 to 250 hours of use, the unsoluble component (carbon) contained in the lubricant has sometimes reached more than 2 or 3 percent by weight.

The shaft seal portion 7 of the turbine shaft 5 is formed larger than the diameter of the shaft 5 for the purpose of obstructing the lubricant injected into the journal bearings 4, 4 by the stepped part located between the outside diameter portion of the shaft 5 and the shaft seal portion 7 whereby preventing the lubricant from leaking through seal ring 8 in the shaft seal portion 7 into the turbine casing 2.

The construction of the turbosupercharger so far described is conventional, and herein lies no feature of this invention. The operation of the turbosupercharger as a whole is also believed to be clearly apparent to those skilled in the art.

The features of the present invention believed to be novel are now described hereinbelow.

The center housing 1 has a narrow hole 17 formed therein towards the wall 16 on the side of the turbine so as to communicate the lubricant feeding hole 12 with the lubricant relief chamber 14. The axis of the narrow hole 17 is upwardly inclined at an angle of α relative to the axis of the turbine shaft 5.

In the embodiment of the present invention shown, the inclination angle α is 0 to 3 degrees.

Figure 2:
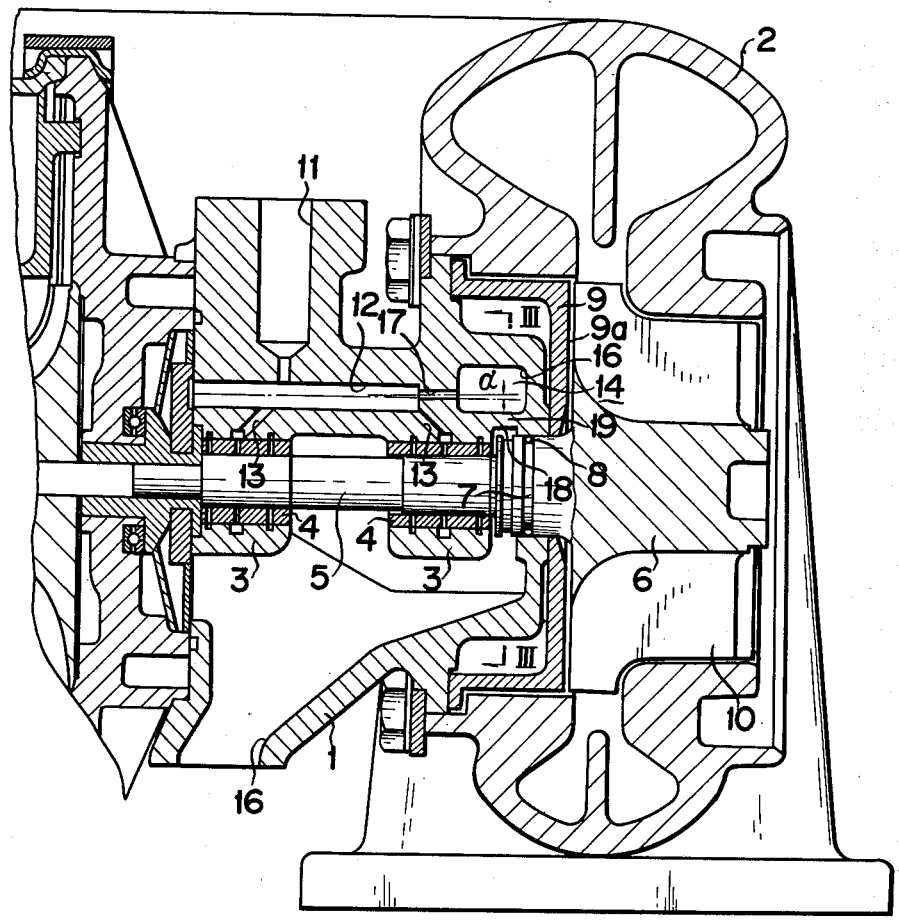
FIG. 2 is similar to FIG. 1 but showing another embodiment of the present invention having a baffle plate arranged therein.
Figure 3:
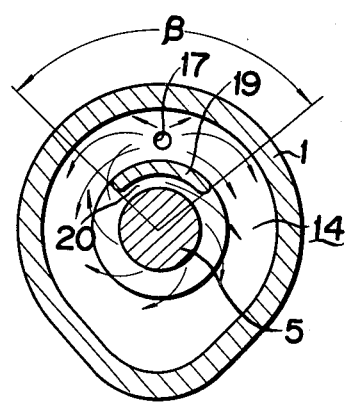
FIG. 3 is a cross-sectional view taken along the line III—III in FIG. 2.

Another embodiment of the present invention shown in FIG. 2 has a bridge shaped baffle wall 19 formed in the lubricant relief chamber 14 above the turbine shaft 5 for transversely connecting the wall 16 on the side of the turbine and the wall 18 on the side of the journal bearing. As shown in FIG. 3, the baffle wall 19 is curved in arcuate shape along the turbine shaft 5, and there is a clearance 20 between the baffle wall 19 and the turbine shaft 5. In other words, the baffle wall 19 is located above the turbine shaft 5 so as to cover it.

Thus, part of the lubricant splashed or slung into the lubricant relief chamber 14 will strike against the baffle wall 19 so that the lubricant can be scattered in wider range thereby reducing the amount of the lubricant flow towards the wall 16 on the side of the turbine rotor.

Since the lubricant is introduced under pressure through the inlet 11, part of the lubricant fed into the hole 12 is injected in the form of oil jet on the wall 16 on the side of the turbine so as to cool the wall 16.

As a result, the temperature of the wall 16 can be reduced to 90° C. to 100° C. thereby reducing the amount of heat to be transferred to the lubricant.

In addition, the amount of the lubricant flow towards the wall 16 on the side of the turbine will be reduced so that the deterioration of the lubricant can be reduced so much.

Further, angle "β" of the baffle wall 19 should preferably be 90 to 180 degrees so that the lubricant injected spirally along the outside diameter portion of the shaft seal portion can not be obstructed completely by the baffle wall 19.

Further, as an alternative to formation of the narrow hole 17, a pipe may be installed.

Since the present invention is constructed as mentioned above, the lubricant can be scattered or splashed by the baffle wall 19 in wider range within the lubricant relief chamber 14 thereby reducing the amount of the lubricant flowing towards the wall 16 on the side of the turbine rotor, and the lubricant can be directly injected in the form of jets through the narrow hole 17 towards the wall 16, and therefore the temperature of the wall 16 can be reduced remarkably.

Therefore, the abovementioned two combined effects can prevent early deterioration of the lubricant.

It is to be understood that the foregoing description is merely illustrative of the preferred embodiments of the invention and that the scope of the invention is not to be limited thereto, but it is to be determined by the scope of the appended claims.

What I claim is:

1. In a turbosupercharger including a center housing having an inlet and an outlet for lubricant, a turbine casing mounted on said center housing at one end thereof, a compressor casing fixedly secured to said center housing at the other end thereof, a turbine shaft rotatably supported within said center housing, said turbine shaft having a turbine rotor at one end thereof within said turbine casing and a compressor rotor at the other end thereof within said compressor casing, said turbine shaft also having a shaft seal portion formed thereon at the turbine side thereof on which sealing means is adapted to be mounted to prevent lubricant leakage from said center housing to said turbine casing, and a chamber defined within said center housing, an opening thereof being adapted to receive the lubricant slung out of the outer periphery of the shaft seal portion of said turbine shaft, wherein the improvement comprises means in the form of a communication hole formed within said center housing and angled slightly upwardly toward said turbine rotor relative to the axis of said turbine shaft for directly communicating said inlet for lubricant with said chamber, thereby introducing pressurized fresh lubricant into said chamber in the form of an oil jet; and a baffle plate arranged between said chamber and said shaft seal portion of said turbine shaft so as to prevent the lubricant slung out of said shaft seal portion from striking the oil jet of newly introduced fresh lubricant from said inlet.

* * * * *